Figure 1:
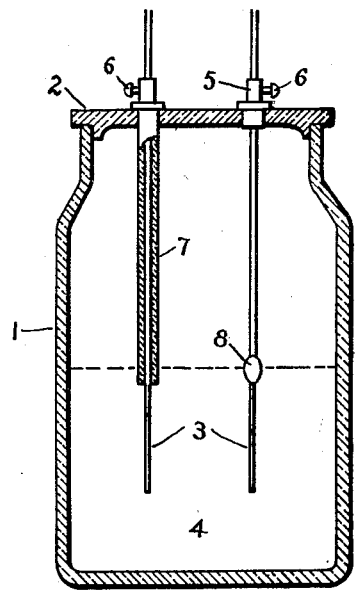

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

ELECTROLYTIC LIGHTNING-ARRESTER.

1,004,533. Specification of Letters Patent. Patented Sept. 26, 1911.

Application filed September 2, 1908. Serial No. 451,300.

*To all whom it may concern:*

Be it known that I, ELMER E. F. CREIGHTON, a citizen of the United States, residing at Schenectady, county of Schenectady, State of New York, have invented certain new and useful Improvements in Electrolytic Lightning-Arresters, of which the following is a specification.

This invention relates to devices for relieving transmission lines of static charges and other abnormally high voltage or frequencies due to lightning, current surges, and the like. I have heretofore invented two forms of lightning arresters, one of the electrolytic condenser type and the other of the liquid electrode type.

Each of these possesses peculiar advantages, and one object of the present invention is to combine in one structure the good points of both.

Another object of this invention is to prevent deterioration of the electrodes by a proper dimensioning thereof with reference to the volume of the electrolyte.

In the aluminum cell arrester, where two aluminum electrodes are immersed in an electrolyte, such for instance as ammonium borate, the passage of current through the cell forms on the electrodes a film of oxid or hydroxid which has a definite resistance depending upon the nature of the electrolyte and the voltage of the current. With copper electrodes, a pressure of two volts will cause a quiet discharge through the cell, but with aluminum electrodes the film formed on their surfaces will raise the limiting voltage for quiescent discharge to a much higher value. With ammonium borate this may be 400 or 500 volts, due to the fact that the resistant film holds back the current and thus keeps down the current density; i. e., the amperes per square centimeter of submerged surface. So long as the current density is kept below a certain value the current will discharge quietly, simply decomposing the electrolyte into its constituent parts, which are liberated at the electrodes. Therefore, by using aluminum electrodes it is possible to run each cell, connected continuously to the circuit, at some convenient voltage below its "critical" value, i. e., the voltage at which the resistant film gives way, and permits a rush of current. The film is not permanently destroyed but simply ceases to restrain the current, acting very much like a spring valve which opens at a predetermined fluid pressure. When the electrical pressure drops below the critical value, the film again shuts it off, just as a spring valve does when the liquid pressure falls below the point at which the spring is adjusted to close it.

In the liquid electrode arrester, the electrodes are not immersed in the electrolyte, but stand close to or barely touching its surface. Here the critical voltage is much higher than in the aluminum cell, depending not on a resistant film value, but on the difficulty of striking and maintaining an arc between a solid metal anode and a liquid cathode.

Now when the voltage rises above the permanent critical voltage of the aluminum cell, the resistant film valve is no longer effective and a rush of current occurs. But if the surface of the electrodes is not large, the current density will at once increase to a point sufficient to start an arc between the electrodes and the electrolyte. This is the action of the liquid electrode arrester. As the flow of current increases, the arcing becomes more and more violent until at length the critical voltage of the liquid electrode is reached, viz. from 1,400 to 1,700 volts, depending upon the electrolyte used. In order to arrive at this critical limiting voltage of the liquid electrode, a certain amount of energy must be expended, depending directly upon the amount of surface of the electrode exposed to the electrolyte.

It will be seen then that if the aluminum electrodes have a submerged surface area which is small as compared with the volume of the electrolyte, the arrester will absorb a considerable quantity of electricity before the voltage reaches a dangerous value. Since the critical limiting voltage of the liquid electrode arrester is about three times that of the aluminum cell, it is advisable to prevent the cell from exercising its full limiting power, unless the insulation of the line is designed to carry that amount of potential for a brief period. The effectiveness of the cell can be limited by choosing an electrode with an exposed surface large enough to discharge a quantity of electricity comparable to the quantity which will be generated on any system. It is thus possible to regulate the amount of energy absorbed in the arrester, so that it will take in all the lightning charge without permitting the voltage across the arrester to rise to a dangerous value.

An ordinary series gap arrester requires a rise of potential to at least 150 per cent. of the normal before the gaps break down and permit the arrester to discharge. But with my arrester, in which the circuit from line to line and from line to ground is always complete, the discharge begins the instant the voltage rises above the normal value at which it has been designed to work, so that during the time that the potential is rising to 150 per cent. or more of the normal, there is a steady discharge which relieves the line to a great extent of the lightning charge before the point is reached at which a gap arrester would just begin to discharge.

From what has been said it will be understood that if a cell which has a permanent critical film voltage of 420 volts is operated at a normal potential of 250 volts, the latter may be termed its temporary critical film voltage. If the pressure rises above this value, the film valves open and there is an appreciable rush of current which after a measurable time will thicken the film and enable it to close again. Above the permanent critical voltage, the film valves open wide and remain open. The voltage can rise further only by forming an arc and throwing the liquid away from the metallic electrode. The action of the arrester from normal potential to the maximum liquid electrode potential may be said to advance by stages. Increases of quantity above the normal form new film valves, or rather, thicken or reinforce the old film valves, up to the critical film voltage of the aluminum cell. Further increases in quantity increase the current density up to the point where the arc starts. This will be accomplished without any appreciable increase in potential. After the arc starts the continued flow of current will raise the potential until the critical limiting voltage of the liquid electrode is reached. The procedure, therefore, which I prefer to follow is to form the film at the normal voltage at which the cell is to run; that is, the temporary critical voltage, instead of the higher permanent critical voltage. A number of such cells connected in series will protect any given line, the circuit being constantly closed. If one cell attempts to increase its voltage, the greater quantity of leakage current in that cell will tend to thicken the film and so equalize the conditions between the cells.

Another feature which I have discovered is the necessary relation between the volume of the electrolyte and the submerged surface area of the electrodes. I find that if this ratio is large, the electrode is less liable to be destroyed. The point on the electrode at which the most damage is visible is where it enters the electrolyte, and to obviate corrosion at this point I jacket the electrode a suitable distance above and below the surface of the liquid by means of a glass, or porcelain tube, or a coating of wax, or the like.

Figure 2:
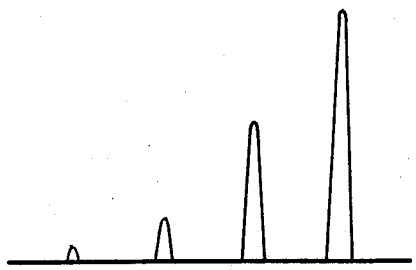

In the accompanying drawing, Figure 1 is a vertical section of a cell embodying my improvements, and Fig. 2 is a diagram of current values.

The jar 1 is made of glass or the like, and has a wide mouth closed by a lid 2 of insulating material, through which pass two aluminum wires 3, which dip into a volume of electrolyte 4. The wires are supported in any suitable manner, as for instance by flanged bushings 5 having set screws 6. The electrodes are protected at the point where they enter the electrolyte, either by a glass or porcelain tube 7, or by a coating 8 of hydrocarbon wax. The volume of the electrolyte is considerable as compared with the wetted surface of the electrodes.

Fig. 2 shows typical forms of oscillograph curves of discharge current when the cell is operating as a liquid electrode arrester, the different curves resulting from immersion of copper electrodes to different depths. These four curves show that the current increases as the surface exposed to the electrolyte increases.

What I claim as new and desire to secure by Letters Patent of the United States, is:

1. A lightning arrester of the electrolytic type, comprising aluminum electrodes of such size that the current density will start an arc to the electrolyte before the critical limiting voltage of a true liquid electrode arrester is reached.

2. A lightning arrester of the electrolytic type, comprising electrodes which first oppose a resistant film to the current flow, and after the critical voltage thereof is passed develop an arc which considerably increases the cell opposition to current flow.

3. A lightning arrester comprising a vessel containing an electrolyte, an aluminum electrode projecting into the electrolyte and having a resistant film of such extent that the current density becomes great enough to develop an arc which considerably increases the cell opposition to current flow before the critical limiting voltage of a true liquid electrode arrester is reached.

4. A lightning arrester comprising a vessel containing an electrolyte, and aluminum electrodes projecting into the electrolyte and having a film which is resistant to the current flow, said electrodes having an immersed surface of such extent that increase of voltage above the critical limiting voltage of said film develops an arc which substantially increases the opposition of the cell to current flow.

5. A lightning arrester of the electrolytic type comprising a vessel containing a suitable electrolyte and aluminum electrodes covered with a resistant film and projecting into the electrolyte, said electrodes having their surface so proportioned that at voltages below the critical limiting voltage of a true liquid electrode arrester the current density will start between the electrodes and the electrolyte an arc which markedly increases the resistance of the cell to current flow.

6. The method of operating an aluminum cell lightning arrester, which consists in running it at a normal voltage below its critical film voltage, and providing that the current density shall start an arc which materially increases the opposition to current flow before the potential rises to the liquid electrode critical voltage.

In witness whereof, I have hereunto set my hand this 31st day of August, 1908.

ELMER E. F. CREIGHTON.

Witnesses:
BENJAMIN B. HULL,
MARGARET E. WOOLLEY.